United States Patent [19]

Bestler et al.

[11] Patent Number: 5,479,508
[45] Date of Patent: Dec. 26, 1995

[54] METHOD OF OPERATING A PAY PER VIEW TELEVISION SYSTEM

[75] Inventors: Caitlin B. Bestler, Chicago; Larry K. Moreland, McHenry, both of Ill.

[73] Assignee: Zenith Electronics Corp., Glenview, Ill.

[21] Appl. No.: 703,986

[22] Filed: May 22, 1991

[51] Int. Cl.⁶ .................................................. H04N 7/167
[52] U.S. Cl. ........................... 380/20; 380/10; 380/23; 348/5.5; 348/6; 348/10; 455/3.1; 455/4.1; 455/6.1; 455/6.2
[58] Field of Search ................................. 358/84, 86, 349; 380/5, 7, 10, 20, 23, 25; 455/3.1, 4.1, 4.2, 5.1, 6.1, 6.2; 340/825.31, 825.34; 348/1, 5.5, 6, 7, 10

[56] References Cited

U.S. PATENT DOCUMENTS

| 4,494,142 | 1/1985 | Mistry | 380/20 |
| 4,577,224 | 3/1986 | Ost | 380/20 |
| 4,658,292 | 4/1987 | Okamoto et al. | 380/20 |
| 4,947,429 | 8/1990 | Bestler et al. | 380/20 |

*Primary Examiner*—Bernarr E. Gregory

[57] ABSTRACT

A method of operating a cable system having premium channel encoders and dedicated smart pay per view encoders, each associated with an individual channel. The pay per view encoders are provided with the addresses of certain subscriber stations that have been approved to decode pay per view events on the associated channels. These certain subscriber stations are addressed on a priority basis by the pay per view encoder handling the pay per view event to set their authorization memories to decode the pay per view event. The authorization memories are updated by RAM groups of five program tags. All of the PPV encoders are assigned to the same RAM group so that in updating authorization memories, the authorization of a subscriber station memory for another pay per view event is not altered. The authorization process is rapidly accomplished and is repeated for a period of time after commencement of the pay per view event. The certain subscriber stations are immediately deauthorized by the same pay per view encoder at the end of the pay per view event.

7 Claims, 1 Drawing Sheet

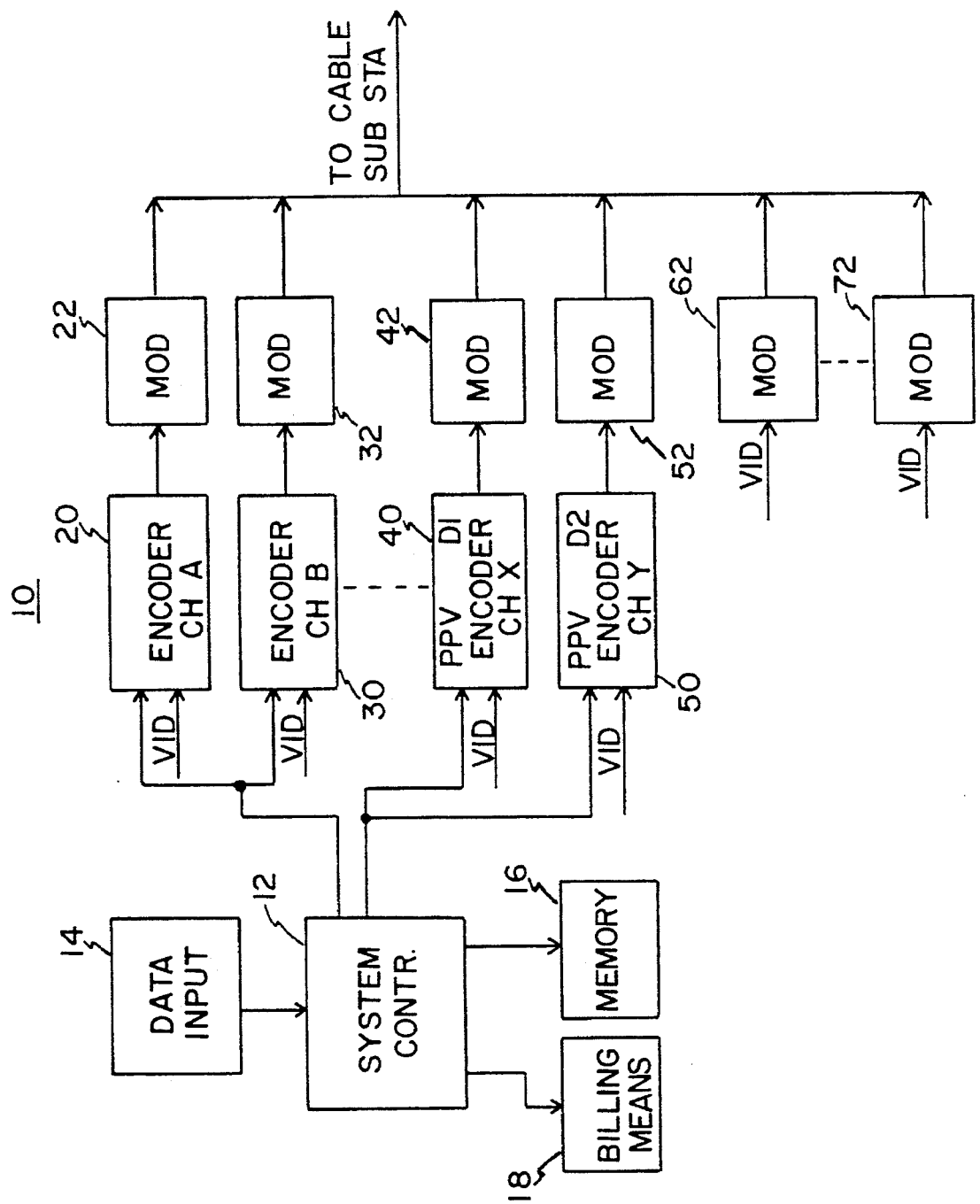

5,479,508

METHOD OF OPERATING A PAY PER VIEW TELEVISION SYSTEM

BACKGROUND OF THE INVENTION AND PRIOR ART

This invention relates generally to cable television systems and specifically to a method of improving the operation of a cable system having one or more dedicated pay per view (PPV) channels.

U.S. Pat. No. 4,460,922 issued Jul. 17, 1984 in the names of J. Ensinger and M. Hendrickson, assigned to Zenith Electronics Corporation and incorporated herein by reference, describes generally the memory select system for the Z-TAC decoder manufactured by Zenith Electronics Corporation. That system includes in-band addressable subscriber stations, each with a unique address and authorization memory organized to provide a number of tiers or programming categories. The subscriber stations are supplied data on specific horizontal lines of the television signal vertical blanking interval (VBI). The patent describes a memory read and select technique that obtains the benefits of a system having a larger number of programming tiers without the detriment of increasing the bit length of the subscriber authorization codes. The authorization memory is divided into four so-called RAM groups, each comprising five tiers or programming categories, with one of the RAM groups being reserved for pay per view events.

A pay per view event differs from a premium service of the cable system in that the pay per view event is for a relatively short time. It generally consists of a single program, which may be periodically repeated. Premium services such as movie channels, sports channels and the like are generally provided on a continuing subscription basis. Pay per view programming, on the other hand, is provided on an individual "buy" basis. PPV events generally include special type movies which are offered a selected number of times during a month and "live" programs such as special sporting events. Such pay per view events are usually assigned to a specific one or more channels, each having its own encoder. The encoders accept subscriber address and authorization memory update and refresh information from the system controller and attempt to communicate with all subscriber stations by data addressed to the individual subscriber stations.

It is very desireable to be able to rapidly authorize subscriber stations to decode pay per view events and also to provide for recurring pay per view events on the same channel. Both the authorization and deauthorization processes must occur rapidly to effectively utilize the pay per view channel capability. In the Z-TAC system, the ability to rapidly authorize/deauthorize the subscriber stations is limited by the need to transmit an entire RAM group of the authorization memory to make any change as well as the need for the system controller to continually update and refresh subscriber station authorization memories as mentioned above. The system controller need not be involved for non-premium or so-called "basic" programming since such signals are not encoded. Indeed a subscriber station may not even have a decoder box if a cable-ready television receiver is installed.

Since communication between the cable head-end and the individual subscriber station is in-band, the subscriber station must be tuned to a data channel (i.e. one whose television signal carries data in the VBI) in order to have its subscriber authorization memory changed or refreshed, both herein referred to as being updated. A "homing" channel is often provided for communications purposes, the homing channel being accessed automatically when the individual subscriber station decoder is turned off. The system controller, via the channel encoders, periodically and continually circulates authorization memory update information to the individual subscriber stations. However there are still situations in which a subscriber station does not tune to a data channel on a reasonably timely basis with the result that the subscriber station authorization memory may not be updated.

The in-band data format of the Z-TAC system limits the addressing rate to approximately 2700 subscriber stations per minute for a full four RAM group (20 program tags) authorization, or approximately 10,800 decoders per minute for a single RAM group authorization. While the addressing rate is more than adequate for premium channel service changes, new installation turn-ons and authorization memory refreshment, difficulty is encountered in rapidly authorizing and deauthorizing subscriber stations for pay per view events. This is especially true where the subscriber station may determine to "buy" a PPV program at the last minute.

OBJECTS OF THE INVENTION

A principal object of the invention is to provide an improved method of operating a cable system having a pay per view channel.

Another object of the invention is to provide a pay per view cable system in which certain authorized subscriber stations are addressed on a priority basis.

BRIEF DESCRIPTION OF THE DRAWING

These and other objects and advantages of the invention will be apparent upon reading the following description in conjunction with the drawing, the single FIGURE of which comprises a partial block diagram of a cable system operating in accordance with the inventive method.

DESCRIPTION OF THE PREFERRED EMBODIMENT

The above described Z-TAC cable system and similar cable systems capably handle premium subscription service upgrades and downgrades and a limited number of pay per view events. Difficulties arise with multi-channel continuous pay per view operations. The large number of these decoders in service imposes a limitation on the ability to use such decoders for multi channel back-to-back pay per view events. As mentioned, the problem is compounded because of the relatively slow in-band data system which, while minimizing decoder cost and increasing encoding security, limits the number of decoder that can be rapidly and reliably addressed. Further, once a decoder is authorized for a particular pay per view program or event, its authorization memory retains the authorization until specifically deauthorized. Also, there are a very limited number of reusable program tags available, thus requiring very rapid deauthorization at the end of a pay per view event. The method of the invention overcomes these limitations without compromising cable system security.

Referring to the drawing, a cable head-end 10 is generally indicated in block form. The head-end includes a system controller 12 that is provided with input information from a data input source 14. System controller 12 accesses a memory 16 and a billing computer 18. This arrangement is well known in the art and is not part of the present invention.

System controller 12 supplies a group of premium and pay per view encoders. An encoder 20, labelled channel A, and an encoder 30, labelled channel B, are illustrated for premium services. The encoders should be understood to include the capability of handling subscriber station authorization memory change information, changes in service programming, deauthorization information and all of the pay per view data authorizations and deauthorizations received in the cable system, all referred to herein as updates. The outputs of the encoders 20 and 30 are coupled to suitable modulators 22 and 32, respectively, which supply the appropriate channel frequency television signal information with in-band data to the remainder of the cable plant (not shown).

System controller 12 also supplies information, on an individual basis, to a PPV encoder 40 and to a PPV encoder 50 which are labelled channel X and channel Y, respectively. Encoder 40 also carries a designation D1 and encoder 50, a designation D2. These designations D1 and D2 refer to the "D" RAM group of the authorization memories of the subscriber stations. Encoder 40 is responsible for any cable television programs bearing the authorization bit or tag D1 and encoder 50 is responsible for any programs bearing the authorization program tag or bit D2. Encoders 40 and 50 are similarly coupled to appropriate modulators 42 and 52, the outputs of which are supplied to the cable plant. Lastly, other modulators 62 and 72 are shown for illustrative purposes only, since they supply unencoded basic service television signals to the cable plant. It will be appreciated that the apparatus for providing the accompanying audio signals are not illustrated. Also, the system controller redundantly supplies the information supplied to the PPV encoders 40 and 50 separately to the premium channel encoders 20 and 30 for updating all subscriber stations in the normal course of events.

The encoders 20 and 30 are standard and function in accordance with the description in the above-mentioned patent. Each of PPV encoders 40 and 50 is different in that each has the ability to accept information from system controller 12 and to optimize that information for its particular channel. These PPV encoders are referred to as "smart" encoders. Specifically, encoder 40 receives all subscriber information involving authorization tag D1 (one tier of a RAM group) from system controller 12 as well as all subscriber information regarding other bits (D2, etc.) in the D RAM group. The PPV encoder 40 also has the capability of remembering a number of things about a large group of subscriber stations (65,536 subscriber stations in the above-described Z-TAC system). Each of PPV encoders 40 and 50 tracks all subscriber stations that are authorized for the current PPV event bearing the program tag with which the encoder is associated or the next PPV event bearing that program tag. This information enables each decoder to authorize (and deauthorize), on a priority basis to the exclusion of other subscriber station updating, subscriber station decoders that are tuned to its associated channel. Thus the entire output of each of the smart PPV encoders is optimized for exclusively supporting pay per view events on its associated channel. This results in rapid turnover of a program tag since the PPV encoder dedicates all of its output to deauthorizing subscriber stations that were authorized for a prior program and to authorize subscriber stations for decoding a subsequent PPV program. The downstream rate of 10,800 subscriber station decoder updates per minute permits a complete turnover of virtually any PPV event in under two minutes, since the PPV encoder algorithm need only address those subscriber stations that actually purchased either the prior or the subsequent PPV event.

As mentioned, PPV encoders 40 and 50 are in the same program tag group or RAM group (the D group). Since the in-band communication is in one direction only and no confirmation of an update or change in a subscriber station authorization memory is received by the cable head-end, it is important not to inadvertently authorize or deauthorize a subscriber station for other PPV events on other channels when authorizing or deauthorizing that subscriber station for a particular PPV event. To avoid this, both encoders 40 and 50 receive the same updating information from system controller 12 concerning which of the subscriber stations is to be authorized and for what program. The need in the Z-TAC system to address an entire RAM group makes it advantageous to associate the PPV encoders according to RAM groups. Each PPV encoder in the group can dynamically select its output priorities based upon the information from the system controller about the PPV events being shown on its channel and on other PPV encoder channels in the same group. Each PPV encoder in the group thus "hears" the same set of PPV "buys" and program changes and each can optimize its output separately for its particular program tag and determine which authorization records are the most important for it to maintain. In a high capacity situation, each of the five encoders in the group would service a different set of 65,536 subscriber stations and still assure that the encoders did not have contradictory information. This will enable a PPV encoder 40 for example to authorize subscriber stations on its channel for program tag D2, as well as for D1, so that the subscriber station could switch between the two channels and not be deauthorized in the process.

The algorithm further provides for long term retention of the subscriber station address of any subscriber station that had purchased a PPV event on the particular channel. On a low priority basis, the PPV encoder remembers those subscriber stations that it has deleted from its active memory and periodically deauthorizes them. Thus with the method of the invention, a large number of back-to-back pay per view events may be transmitted on a single channel with minimum unauthorized viewing and minimum wait time for an authorized subscriber station to begin decoding the PPV event.

What is claimed is:

1. A method of operating a television system having premium channels and pay-per-view channels and individual encoders associated with said premium channels and said pay-per-view channels and including a plurality of in-band addressable subscriber stations, each having an authorization memory for controlling associated decoding apparatus, the encoders for said premium channels regularly addressing all said subscriber stations for refreshing and updating said authorization memories comprising:

using each pay-per-view channel encoder to address only certain subscriber stations that have purchased a given pay-per-view event on the channel associated with said pay-per-view encoder to the exclusion of all other subscriber stations; and changing the authorization memories of said certain subscriber stations to enable decoding of said given pay-per-view event.

2. The method of claim 1 further comprising:

addressing said certain subscriber stations with the associated pay-per-view encoder in a priority manner to enable decoding shortly before and for a period after commencement of said pay-per-view event; and addressing said certain subscriber stations to disable decoding shortly after termination of said pay-per-view event.

3. The method of claim 2 wherein said authorization memories each have a plurality of bits that must be updated or refreshed in groups and wherein each of said pay-per-view encoders is associated with a different one of said bits in a single group, further comprising:

remembering in each said pay-per-view encoder information about the status of other bits in said group so that the status of said other bits in the authorization memories of said certain subscriber stations is not changed.

4. The method of claim 3, further comprising:

remembering all subscriber stations that have ever been previously authorized for a pay-per-view event on said channel; and addressing all such previously authorized subscriber stations on a lower priority basis to assure deauthorization of their respective authorization memories.

5. The method of claim 4, further comprising redundantly authorizing and deauthorizing said certain subscriber stations and deauthorizing said previously authorized subscriber stations via said encoded premium channels on a non-priority basis.

6. The method of claim 2 wherein each said pay-per-view encoder is associated with a single bit in a group of bits in said authorization memories, all bits in said group being required to be updated or refreshed together, and further comprising:

providing updated status information about all bits in said group to each pay-per-view encoder to obviate erroneous updating of bits in said group associated with others of said pay-per-view encoders.

7. A method of operating a cable system having encoded premium channels and encoded pay-per-view channels and separate associated with each of said channels, said system including a plurality of uniquely addressable subscriber stations, each having an authorization memory including groups of bits that may be changed in groups by in-band data on any of said encoded channels for controlling decoding apparatus in said subscriber stations, one of said groups of bits being used for pay-per-view events comprising:

supplying to each pay-per-view encoder the addresses of subscriber stations that have purchased pay-per-view events and the channels associated with said pay-per-view events;

using each pay-per-view encoder to repetitively address only said certain subscriber stations that have purchased a pay-per-view event on its associated channel to update said group of bits in said authorization memories to permit decoding of the associated pay-per-view event; and using each pay-per-view encoder to deauthorize said certain subscriber stations immediately after the associated pay-per-view event.

* * * * *